April 9, 1968 C. G. MUNTERS 3,377,225
METHOD FOR THE MANUFACTURE OF GAS CONDITIONING PACKING
Filed April 25, 1966

INVENTOR
CARL GEORG MUNTERS

BY *Sol B. Wiczer*
ATTORNEY

United States Patent Office 3,377,225
Patented Apr. 9, 1968

3,377,225
METHOD FOR THE MANUFACTURE OF GAS CONDITIONING PACKING
Carl Georg Munters, 3 Danderydsvagen, Stocksund, Sweden
Continuation-in-part of application Ser. No. 202,333, June 13, 1962. This application Apr. 25, 1966, Ser. No. 545,056
8 Claims. (Cl. 156—210)

ABSTRACT OF THE DISCLOSURE

Heat and/or moisture transfer laminated corrugated bodies formed of an alternate lamina of a corrugated layer with a plane layer of sheets of asbestos, cohered and cured by impregnating the fiber with inorganic particles and which, for temporary assembly purposes may also contain organic fibers as well as organic adhesive, and the assembled body is heated to fuse the inorganic particles into a permanent body between asbestos fibers of great strength and stability, preferably set by oxidizing the corrugated body in a stream of air at a controlled rate so that only sufficient heat is provided to fuse the inorganic particles but insufficient to expel water of crystallization from the asbestos fiber, thereby avoiding chemical destruction of the asbestos fiber.

---

Figure 1:
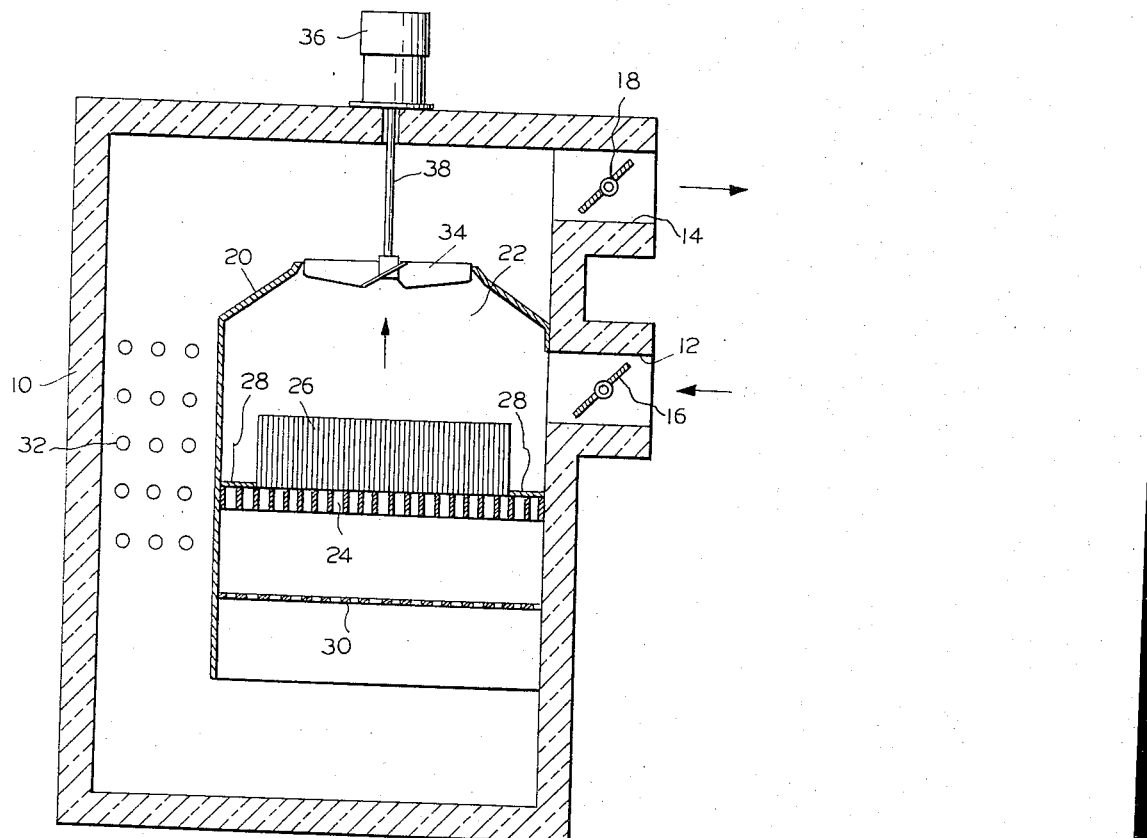

This application is a continuation-in-part of copending application Ser. No. 202,333, filed June 13, 1962, and now abandoned.

The present invention relates to a method for the preparation of an inorganic fibrous heat and moisture transfer body having parallel gas permeable cells extending across the body. More particularly, the present invention relates to a method for bonding and heat-curing an inorganic fibrous cellular body with fused particles of an inorganic bonding material at temperatures controlled to fuse said bonding particles and impart substantial bonded fibrous structural strength and stability characteristics to the cellular body.

In the preparation of heat and moisture transfer bodies it is desirable to use thin-walled fibrous sheets of inorganic fibers such as asbestos, assembled and firmly bonded into a laminate by spiral winding or as a rectangular block, and having gas permeable cells extending parallel from one side of the body to an opposite side for easy gas flow therethrough. The body of laminated inorganic fibrous sheets such as of asbestos in use for heat and moisture transfer systems have gases passing through different body portions to absorb moisture in one portion and expel it from another portion, each body portion being at a substantial temperature differential from the other. The cellular body is sometimes impregnated with a desiccant substance such as silica gel or lithium chloride to enhance its moisture-transfer capacity.

The fibrous cellular body, variable with the particular composition materials, is subjected to temperatures ranging from about 200 to about 700° C. for regeneration, and this is usually in the presence of air which may supply uncontrolled oxidation and not only destroy organic materials contained in such body, but can release excessive heat to melt, fuse or chemically destroy the structural strength of some fibrous materials. For instance, at temperature of about 1000° C., asbestos fiber, a preferred fibrous material for use in this invention, will lose water of hydration and be converted to a weak, easily-powdered material which is undesirable for present purposes. For these reasons the inorganic materials for bonding must fuse or melt at the curing temperature.

According to the present invention an inorganic fibrous material such as asbestos, before or after forming into sheets, is treated with a water insoluble suspension of inorganic binder materials with or without further addition of temporary organic binder materials. The sheets are then assembled, usually after corrugating and temporarily bonding into a cellular body as described, or such preformed cellular body may be impregnated or coated with the inorganic binder material and the dried structure is then heat-cured. The green or uncured assembled structure containing inorganic binder with or without an organic binder is then heat-cured by heating the assembled body to a critical fusion temperature of the inorganic binder material, a temperature sufficient to fuse the inorganic particles and thus effect a bond between the inorganic fibers, but at a temperature below that at which the inorganic fibers are damaged or destroyed. Such temperature control is effected according to the present invention by heating while circulating gas through the porous structure at a rate and containing only sufficient oxygen to release a limited quantity of heat and thus to allow close temperature control for oxidation of the organic materials present in the structure. Thus, the heat-curing operation effects the inorganic bonding in the presence of the circulating gases controlled to destroy any organic materials present at a temperature controlled below that at which the inorganic fibrous structure is destroyed or damaged; and in the case of asbestos fibers specifically, below that temperature at which water of crystallization will be evolved from the asbestos fiber.

By the practice of the present invention, inorganic fibrous materials may be cured into strong, thin-walled cellular bodies having gas permeable cells extending in the axial direction of the structure and substantially gas-impermeable walls extending in the radial direction.

It is an object of this invention, therefore, to provide a method for heat-curing to bond a raw cellular structure of a non-metallic inorganic fibrous base material with an inorganic bonding agent.

It is another object of this invention to provide a method for heat-curing an inorganic fibrous base material having a rugged heat and moisture-resistant cellular structure particularly adapted to transfer of heat and/or moisture under extreme temperature changes over extended periods of time.

It is yet another object of this invention to provide a method for heat curing a thin-walled cellular body in an atmosphere of heated oxygen-containing gas which is passed through the cellular structure such that residual organic materials within the inorganic fibrous base may be oxidized without ignition.

It is a further object of this invention to provide a method for the manufacture of a heat and/or moisture transfer body having an inorganic fibrous base bonded by fused inorganic particles into a strong, thin-walled cellular body having gas-permeable cells extending in an axial direction and substantially gas-impermeable walls of the cells extending in a radial direction and which may contain a coating of a hygroscopic substance for transfer of moisture to a hot stream of fluid such as air or other gas.

Figure 2:
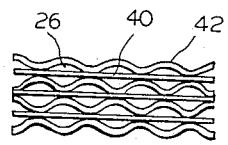

These and other objects and advantages of the present invention will become more readily apparent from the following detailed description of the invention taken in conjunction with the drawings in which:

FIG. 1 is a side elevational view of a heat-curing kiln useful for carrying out the method of the present invention; and FIG. 2 is a partial top-elevational view of the cured, thin-walled cellular body illustrated in larger scale than the corresponding cellular body being cured in the kiln of FIG. 1.

In the method of the present invention a cellular body composed of an inorganic fibrous base material containing organic residuals is formed into thin sheets of a thickness not exceeding about 1/10 millimeter. The thickness of these sheets for the cellular body walls, although desirably not exceeding about 1/10 millimeter, need only be limited by the strength characteristics desired in the final structure since it is recognized that the effectiveness of the transfer system for the transfer of moisture and/or heat per unit time is dependent on the wall thickness.

It is sometimes desirable to add a combustible organic adhesive to the inorganic base material either to the batch of material prior to the formation of the thin sheets or as a coating on the preformed sheets, or even to the laminate thereof as it is being formed to allow preliminary bonding to a stable assembly. The amount of adhesive added to the inorganic base material is sufficient for support of the cellular walls in the uncured state although limited to an amount which may be controllably oxidized and removed during the heat-curing operation. The combustible organic adhesive usefully added to the uncured fibrous base material includes common commercial adhesive substances such as starch, casein, soya protein or the like. Other similar organic materials may be separately added or the adhesive materials may be added in combination if desired.

In forming the cellular body it is sometimes useful to include some combustible cellulose fiber admixed with the inorganic fiber in the uncured state and prior to formation of the thin sheets; or cellulose intermediate sheets may be included in the laminated assembly as it is formed. The cellulose fiber being combustible is destroyed by the controlled combustion during the curing of the assembled inorganic fibrous body.

Although the thin-walled cellular body may be formed in any desired configuration, it is desirable that the structure be formed by cohesion of corrugated sheets of thin-walled base inorganic fibrous material disposed as a laminate or in a circular or ovular pattern. Rectangular laminated configurations of the thin-walled base material wherein the corrugated layers are disposed in parallel relationship may also be formed if desired.

The inorganic fibrous materials forming the base of the cellular body may be exemplified by asbestos filaments having extremely fine diameters. These filaments may be reenforced by an inorganic binder such as powder of enamel which serves as an adhesive for the asbestos filaments after the cellular body has been heat cured. The applied powder of enamel desirably has a powder consistency approximate to that of flour and may be suspended in a liquid such as water, alcohol or the like which readily evaporates during the heat-curing or enamel fusing operation. The power of enamel may be applied to the inorganic filaments during the blending of the base such that the base is effectively impregnated with the powder of enamel prior to the fusing operation. Alternate methods for applying the powder of enamel such as by spray, brush-coating or the like may also be used for application of enamel to the asbestos filaments if desired.

After the asbestos base has been formed in the thin-walled cellular configuration, the uncured assembly is heated while an atmosphere of oxygen-containing gas exemplified by air is passed through the cellular structure. The fibrous base material is subjected to a heat-curing temperature sufficiently high for fusion of the enamel for bonding of the fibers to result. Practically, the fibrous base material is heat-cured at a temperature in the neighborhood of above 200° C. and below the temperature at which water of hydration is expelled from the asbestos fibers.

During the heat-curing operation, it is necessary that the organiac materials in the asbestos base be slowly oxidized and rendered heat stable. Due to the low ignition temperatures of the organic materials, improper heat-curing of the cellular body may disintegrate the asbestos fibers to fine powders such that the affected areas have reduced strength characteristics. Accordingly, the heat-curing operation is performed such that the organic materials or the asbestos base are controllably oxidized by passing an atmosphere of oxygen-containing gases through the cellular structure. The volume of the oxygen-containing gas passed through the cellular structure per unit of time is sufficient to prevent the development of hot spots by the uncontrolled oxidation of the organic materials within the asbestos base. Uncontrolled oxidation of the organic materials may be limited by adjusting either the volume or the oxygen content of the gases being passed through the cellular structure. It is important, therefore, that the organic materials in the asbestos base be oxidized under controlled conditions when the thin-walled configuration is heat cured.

The asbestos fiber base formed as a thin-walled cellular configuration may serve as a support for a hygroscopic substance as a desiccant salt exemplified by lithium chloride, magnesium chloride, calcium chloride or the like. The cellular body may, if desired, be coated with water glass such as sodium or potassium silicate, and the silica may be precipitated on the walls of the cellular body as silica gel by treatment with acid or various precipitating salts to leave a highly porous, absorbent precipitate of silica gel on the cellular walls after drying. Alternately, the thin-walled cellular body may be prepared for humidification of gases by coating the cellular walls with a thin film of an aqueous humectant illustrated by water containing a polyhydric alcohol such as ethylene glycol, glycerol, or lower glycol ethers.

The quantity of hygroscopic substance applied to the fibrous base may be regulated and limited such that the asbestos fibers retain some degree of capacity to absorb moisture. However, should the thin-walled cellular body be intended solely for heat transfer purposes, a coating cover of enamel may be applied on the thin walls as a hard, coherent layer in which case the body becomes highly non-hygroscopic.

Advantages may also result by application of a coherent layer of enamel to one surface layer of the thin-walled cellular body to increase the hardness of the overall structure while retaining the hygroscopic nature of the opposite surface thereof. The resulting structure thus formed is one having a non-hydroscopic surface and a hygroscopic surface.

Referring next to the drawing, kiln 10 is illustrated having structural walls made of any suitable heat insulating material. Formed in one of the walls of kiln 10 is inlet opening 12 and outlet opening 14, each provided with damper 16 and 18, respectively, or similar fluid throttling device. Kiln 10 encloses inner casing 20 formed of sheet metal or similar material defining chamber 22. Positioned within chamber 22 is screen 24 which serves as a platform to support cellular body 26 placed thereon for the heat-curing operation. The portion of screen 24 not covered by cellular body 26 may be covered by shield 28 to insure that substantially all the oxygen containing gas such as air passing through screen 24 also passes through cellular body 26. Perforated plate 30 may be disposed below screen 24 to uniformly distribute the oxygen containing gas over the cross-section of chamber 22. Heater 32 provides a heat source for heating the gaseous medium which is circulated upwardly through chamber 22 and downwardly past heater 32 by means of fan 34 driven by motor 36 through shaft 38.

Cellular body 26 is preferably composed of thin sheets of asbestos which are corrugated or formed in a suitable configuration such that the sheets bear against one another only at mutually-spaced intervals to form cells for passage of heated fluids through the configuration in an axial direction with substantially no gas passage in a radial direction.

In the embodiment of the invention illustrated in FIG. 2, cellular body 26 is composed of alternately disposed plane sheets 40 which may be joined to corrugated sheets 42 by adhesive-containing contact areas. The spacing between plane sheets 40 is desirably less than 3 millimeters and preferably about between 1 or 2 millimeters.

The necessary strength may be imparted to the uncured asbestos sheets by addition of a combustible organic adhesive such as starch and, if desired, the addition of a minor quantity of cellulose fiber usually mixed with the asbestos fibers. The asbestos base may also contain, in addition to cellulose fibers, a fine powder of inorganic bonding material such as powder of enamel which may be applied to the asbestos sheets as previously described. The powder of enamel is fused and bonds the asbestos fibers together during the heat-curing operation which also controllably oxidizes the combustible organic adhesive used in the uncured asbestos assembly.

The oxygen-containing gases circulating within kiln 10 are heated by heater 32 to a temperature between about 200° C. and about 600° C., and preferably about 300° C. and about 500° C. The temperature of the gases circulating within kiln 10 must be regulated to fuse the powder of enamel and controllably oxidize the organic materials within cellular body 26 without destroying the asbestos fibers therein. The temperature of the circulating gases as well as the oxygen content thereof may be adjusted by addition of make-up air into kiln 10 through inlet 12 while a corresponding quantity of gas is permitted to escape through outlet 14.

During the heat-curing operation, the volume of gas circulating within kiln 10 per unit of time may be adjusted to control oxidation of the organic materials while permitting fusion of the powder of enamel at a temperature below that which will cause release of water of hydration from the asbestos fibers. The volume of gas passed through the cells of the cellular body therefore limits the development of uncontrolled oxidation areas in the thin walls of the transfer body being cured. After the transfer body has been heat-cured, the thin sheets forming the walls of the cellular body are held to one another primarily by the fused enamel.

When cellular body 26 is to be used for dehydration purposes, the walls of the body may be coated with a hygroscopic substance such as lithium chloride or the like suitably applied after the heat-curing operation is completed. It is also possible to coat the asbestos fibers prior to the heat-curing operation with a metallic material in powder form of selected fusion points which fuse and reinforce the thin-walled asbestos sheets. The non-desired oxidation of such metals may be prevented by performing the heat-curing operation in an atmosphere containing a large percentage of reducing or inert gases which limit oxidation of the metals.

It will be understood that various changes may be made in the details of the present invention as hereinbefore described without departing from the spirit of the invention as defined by the appended claims.

What is claimed is:

1. The method of forming a transfer body useful for heat, moisture, and both heat and moisture transfer comprising mixing heat decomposable inorganic asbestos fibers with water insoluble inorganic bonding particles fusible at a temperature substantially below the temperature of decomposition of said asbestos fiber, forming the mixed fibers and inorganic bonding particles into a corrugated laminated structure alternately plane and corrugated thin-walled sheets each lamina cohered to the adjacent layer of the laminate and spaced to maintain the depth of the corrugations, thereby providing a plurality of gas permeable channels passing coaxially from side to side of the laminated structure thus formed, and heating said structure to a temperature only sufficient to fuse the inorganic binder particles and below the temperature of decomposition of said fibers and in the range of 200 to 700° C. and thereby bond the inorganic fibers into a mechanically and structurally strong transfer body.

2. The method of forming a transfer body as defined in claim 1 wherein the inorganic asbestos fibers are treated with both inorganic fusible particles and temporary organic adhesive, the coated fibers are then assembled into said corrugated laminated structure and the structure is then heated sufficiently to fuse said inorganic particles and bond the inorganic fibers into a stable structure, the applied heat being controlled by passing a gas through the corrugated laminated structure of said body, said gas containing sufficient oxygen to slowly oxidize the temporary organic adhesive at a temperature in the range not substantially in excess of that necessary to fuse said inorganic fusible particles and less than that sufficient to damage said inorganic fiber.

3. The method of forming a transfer body as defined in claim 2 wherein the inorganic fibers further contain organic fibers which are oxidized with the temporary organic adhesive at a temperature controlled to effect fusion of said inorganic particles and less than sufficient to damage said inorganic fiber.

4. A method for the manufacture of a transfer body which comprises forming an asbestos base material as a thin-walled cellular body of laminated structure comprising a corrugated asbestos fiber sheet alternating with a plane asbestos fiber sheet providing a plurality of gas permeable channels extending from one side to the opposite side in an axial direction and substantially gas impermeable walls extending in the radial direction, said thin-walled cellular body having adjacent walls adhering to one another by a temporary organic adhesive coating said body with a solid inorganic binder substance fusable below about 700° C., heating the thin-walled cellular body to a temperature above about 200° C. sufficient to fuse said inorganic coating, but below about 700° C., the temperature at which water of hydration is expelled from said asbestos base while passing an oxygen-containing gas through the gas-permeable cells extending in the axial direction whereby the fibrous inorganic base is heat-cured with substantial bonding of the inorganic coated fibrous structure.

5. A method for the preparation of an asbestos transfer body having parallel gas-permeable cells extending through the transfer body which comprises, blending an asbestos material with both an inorganic and an organic adhesive material to form a fibrous base, forming thin-walled sheets of said fibrous base, assembling the thin-walled sheets as a laminated cellular body of alternately plane and corrugated sheets comprising a corrugated laminate, each corrugated lamina thereof adhered to an adjacent plane layer, serving to space corrugated layers, thereby providing gas permeable cells extending from one side to an opposite side in an axial gas flow direction and substantially gas-impermeable walls extending in a radial direction, passing an oxygen-containing gas at a temperature between about 200 and 700° C. through the gas-permeable cells to fuse said inorganic adhesive and for the controlled oxidation of organic materials within the fibrous base whereby the fibers of the base are bonded together in the assembled transfer body.

6. The method of forming a transfer body for heat, moisture and both heat and moisture, comprising forming a laminated structure of alternately plane and corrugated thin sheets of asbestos fibers having a plurality of parallel gas permeable channels passing from side to side of the laminated structure, evently distributing a solid fusible inorganic substance over said fibers and heating said structure to a temperature only sufficiently high to fuse said substance, and then to set the same on the fibers without destroying said fiber in the range of 200 to 700° C., thereby imparting a high mechanical strength to the body.

7. The method of forming a transfer body as defined in claim 6 wherein the inorganic fibers in sheet form are first formed into the said corrugated laminated structure, and the body is then coated with a suspension of said water insoluble inorganic bonding particles, said bonding particles being set on said fibers by heating to about the fusion temperature of said particles.

8. The method of forming a transfer body useful for heat, moisture and both heat and moisture transfer, comprising mixing together asbestos fibers, combustible and heat decomposable organic adhesive, and inorganic enamel powder adhesive to provide a fibrous base sheet material, corrugating said sheet material and bonding a plurality of said corrugated sheets together, subjecting said corrugated sheets to a heat curing temperature of between 200 to 700° C. in an oxygen-containing atmosphere whereby the enamel becomes fused and bonds the asbestos fibers together in said corrugated sheets, and the organic materials contained therein are oxidized and destroyed without affecting the asbestos fibers.

References Cited

UNITED STATES PATENTS

| | | | |
|---|---|---|---|
| 1,972,500 | 9/1934 | Toohey et al. | 161—156 |
| 2,554,963 | 5/1951 | Stafford | 161—205 |
| 2,683,096 | 7/1954 | Eckert et al. | 161—205 |
| 2,702,068 | 2/1955 | Spooner | 161—205 |
| 2,810,425 | 10/1957 | Heyman | 156—155 |
| 3,231,409 | 1/1966 | Munters | 117—46 |
| 2,986,379 | 5/1961 | Kramig | 161—137 |

FOREIGN PATENTS 186,409    9/1922    Great Britain.

MORRIS SUSSMAN, *Primary Examiner.*